(12) United States Patent
Hagiwara

(10) Patent No.: US 6,552,867 B1
(45) Date of Patent: Apr. 22, 2003

(54) HEAD POSITIONING CONTROLLER FOR INFORMATION RECORDING AND/OR REPRODUCING APPARATUS WITH HEAD TRACKING OF NONSYNCHRONOUS RADIAL RUNOUT (NRRO) OF THE DISK

(75) Inventor: Hiroyuki Hagiwara, Utsunomiya (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/493,227

(22) Filed: Jan. 28, 2000

(30) Foreign Application Priority Data

Feb. 1, 1999 (JP) ............................. 11-023581

(51) Int. Cl.[7] ............................................. G11B 5/596
(52) U.S. Cl. ................................. 360/77.04; 360/77.03
(58) Field of Search ............................ 360/77.03, 75, 360/77.02, 77.04, 73.03; 369/44.32, 53.14, 53.3

(56) References Cited

U.S. PATENT DOCUMENTS

| | | | |
|---|---|---|---|
| 4,939,599 A | * | 7/1990 | Chainer et al. .......... 360/77.03 |
| 5,394,102 A | * | 2/1995 | Mori et al. ................. 324/772 |
| 5,825,730 A | * | 10/1998 | Nishida et al. .......... 369/44.32 |
| 5,856,624 A | * | 1/1999 | Elsing ........................ 73/865.9 |
| 5,903,408 A | * | 5/1999 | Omi ..................... 360/77.02 X |
| 5,930,066 A | | 7/1999 | Ishizuka et al. |

FOREIGN PATENT DOCUMENTS

| | | | |
|---|---|---|---|
| EP | 0 651 377 A1 | * | 3/1995 |
| JP | 8-55447 A | * | 2/1996 |
| JP | 11-25624 A | * | 1/1999 |

* cited by examiner

Primary Examiner—Andrew L. Sniezek
Assistant Examiner—James L Habermehl
(74) Attorney, Agent, or Firm—Fitzpatrick, Cella, Harper & Scinto

(57) ABSTRACT

An apparatus is constructed to record and/or reproduce information through a head on or from a disk which is an information recording medium. The apparatus has a first driving motor for supporting and rotationally driving the disk; a second driving motor for supporting and rotationally driving the head; a detection unit for detecting a nonsynchronous deflection component of a rotating part of the first driving motor; and a control unit for controlling the second motor, based on detection of the detection unit, so as to make the head track the nonsynchronous deflection component.

10 Claims, 5 Drawing Sheets

HEAD POSITIONING CONTROLLER FOR INFORMATION RECORDING AND/OR REPRODUCING APPARATUS WITH HEAD TRACKING OF NONSYNCHRONOUS RADIAL RUNOUT (NRRO) OF THE DISK

BACKGROUND OF THE INVENTION

1. Field of the Invention

The present invention relates to an information recording and/or reproducing apparatus which can be applied to magneto-electrical characteristic inspection systems for servo track writers, heads, head gimbal assemblies, head stack assemblies, or the like of hard disk drives, and to magneto-electrical characteristic inspection systems for hard disks themselves and which can also be applied to inspection/manufacturing apparatus for optical or magneto-optical recording heads, optical or magnetooptical recording disks, and so on.

2. Related Background Art

The conventional information recording and/or reproducing apparatus of this type is comprised of a disk driving mechanism for rotationally driving a disk as an information recording medium, a head positioning mechanism for positioning a head for recording or reproducing information, relative to the disk, a control circuit for controlling these disk driving mechanism and head positioning mechanism, and so on.

For example, as illustrated in FIG. 1, the disk driving mechanism is composed of a first spindle motor 1, an air bearing 2, a disk 3, a clamper 4, a first encoder 5, and so on, and the head positioning mechanism is composed of a second spindle motor 6, heads 7, gimbal assemblies 8, a loader 9, a second encoder 10, and so on. The control circuit is constructed in such a configuration that a first or second driving circuit 11 or 12 is connected to the first or second spindle motor 1 or 6, respectively, and that a first or second control circuit 13 or 14 is connected to the first or second driving circuit 11 or 12, respectively. A clock circuit 15 is coupled to the first control circuit 13, and the second control circuit 14 and clock circuit 15 are connected to a computer 16.

The computer 16 outputs a target speed of the disk 3 via the clock circuit 15 to the first control circuit 13 and the first encoder 5 outputs an actual speed of the disk 3 to the first control circuit 13. The first control circuit 13 compares the actual speed with the target speed and then outputs a difference between these speeds to the first driving circuit 11. Then the first driving circuit 11 drives the first spindle motor 1 so as to match the actual speed with the target speed. The disk 3 will be rotated at the target speed after repetition of these processes.

The computer 16 outputs a target position of the head 7 to the second control circuit 14 and the second encoder 10 outputs an actual position of the head 7 to the second control circuit 14. The second control circuit 14 compares the present position with the target position and outputs a difference between these positions to the second driving circuit 12. Then the second driving circuit 12 drives the second spindle motor 6 so as to match the actual position with the target position. The head 7 will be set at the target position after repetition of these processes.

In the above conventional example, however, even if the head 7 is set, for example, with the accuracy of ±10 nm, where a nonsynchronous radial runout (NRRO) of the first spindle motor 1 is 30 nm, the maximum deviation will be 50 nm between relative positions of the head 7 to the disk 3. For this reason, supposing a permissible error of track pitch of the disk 3 is 2%, the number of tracks is limited to 10160 per inch and it becomes hard to record or reproduce the information with high accuracy.

SUMMARY OF THE INVENTION

In view of the above, an object of the present invention is to provide an information recording and/or reproducing apparatus that can record and/or reproduce information with higher accuracy.

Other objects of the present invention will become apparent in the description of embodiments detailed hereinafter.

For accomplishing the above object, an information recording and/or reproducing apparatus comprises a first driving motor for supporting and rotationally driving a disk of an information recording medium, a head for recording or reproducing information in or from the disk, and a second driving motor for supporting and rotationally driving the head, the apparatus further comprising a sensor for gaining a nonsynchronous deflection component of a rotating part of said first driving-motor, and the second motor is controlled based on an output of the sensor to make the head track the nonsynchronous deflection component.

DETAILED DESCRIPTION OF THE PREFERRED EMBODIMENTS

The present invention will be detailed based on the embodiments illustrated in FIGS. 2A and 2B to FIG. 6.

Figure 1:
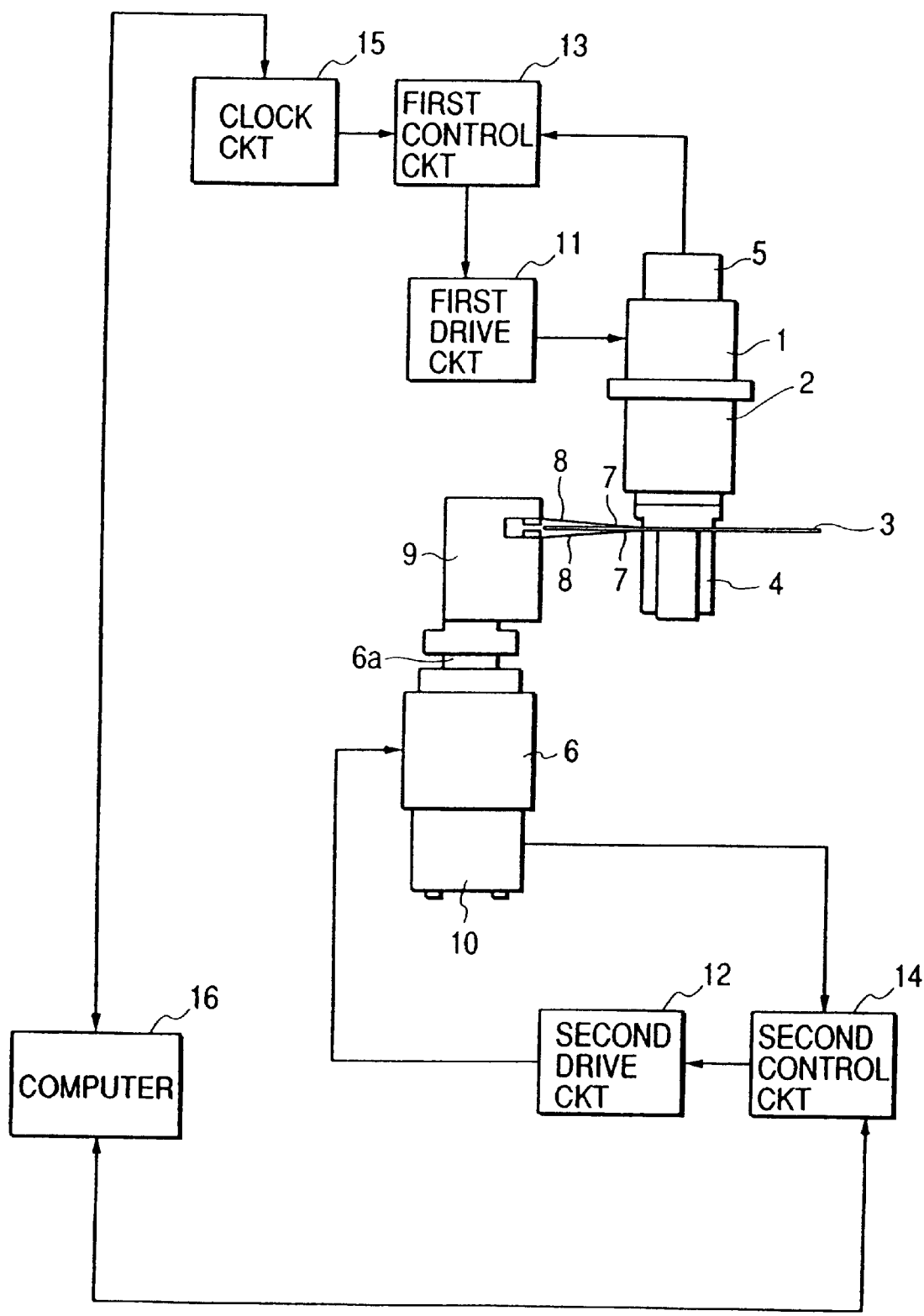
FIG. 1 is a block structural diagram of the conventional example.
Figure 2A:
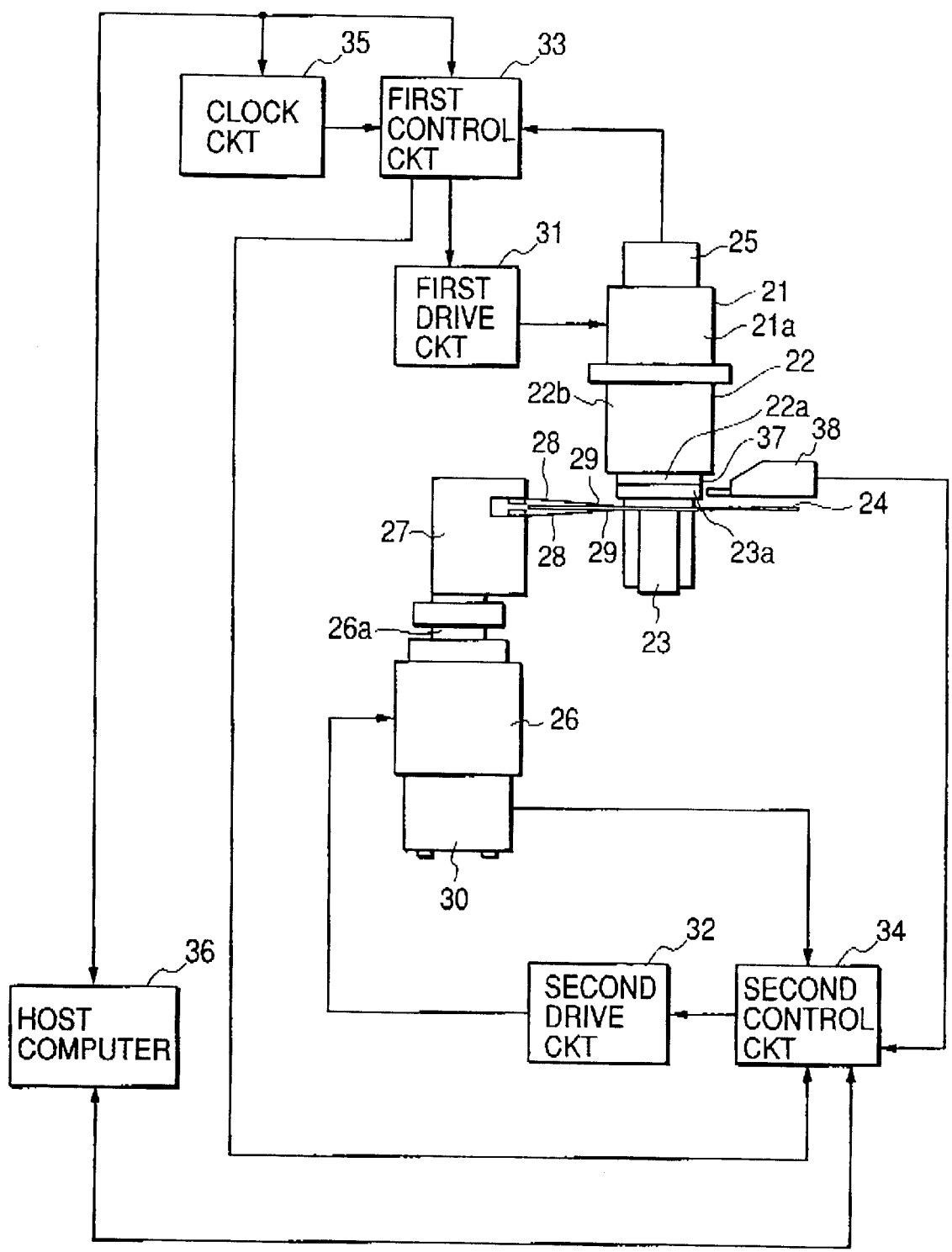
FIG. 2A is a block structural diagram of the first embodiment.

FIG. 2A is a block structural diagram of the first embodiment, in which the first spindle motor 21 has an unrepresented shaft in a rotatable state forward and backward and is supported in a housing not illustrated. A rotor 22a of air cylinder 22 is coupled to the lower part of the shaft of the first spindle motor 21 and a stationary part 22b of the air cylinder 22 is coupled to a stationary part 21a of the first spindle motor 21. A clamp unit 23 is coupled to the rotor 22a of the air cylinder 22 and a disk 24 as a medium for magnetically recording information is detachably attached to the clamp unit 23. The first encoder 25 for detecting a rotating angle of the shaft of the first spindle motor 21, the rotor 22a of the air cylinder 22, the clamp unit 23, etc. is attached to the upper part of the first spindle motor 21. In this case, a disk-shaped scale of the first encoder 25 is coupled to a shaftlike rotating part fixed to the shaft of the first spindle motor 21.

On the other hand, the second spindle motor 26 supported in a housing also has a shaft 26a in a rotatable state forward and backward and a mount 27 is fixed to the upper part of the shaft 26a. A pair of gimbal assemblies 28 are detachably attached to this mount 27. A pair of heads 29 for magnetically recording or reproducing information in or from the disk 24 are supported at the tip of the gimbal assemblies 28 so as to be movable on both sides of the disk 24. The second encoder 30 for detecting a rotating angle of the shaft 26a, the mount 27, the gimbal assemblies 28, etc. is attached to the lower part of the second spindle motor 26 as in the case of the first encoder 25.

The first or second driving circuit 31 or 32 is connected to the first or second spindle motor 21 or 26, respectively, and the first or second control circuit 33 or 34 to the first or second driving circuit 31 or 32, respectively. The first and second control circuits 33, 34 are connected to each other and the clock circuit 35 is connected to the first control circuit 33. The first and second control circuits 33, 34 and the clock circuit 35 are coupled to a host computer 36.

At a rotating part 37 between the air bearing 22 and the disk 24, a gap sensor 38 for detecting the roundness or eccentricity of this rotating part 37 is placed in the vicinity thereof and an output of this gap sensor 38 is coupled to the second control circuit 34. For example, the gap sensor 38 is constructed so as to detect both the eccentricity of the rotor 22a and the roundness of flange part 23a simultaneously. The gap sensor 38 is designed to output an index pulse signal per rotation of the rotating part 37, making use of interference between radiated light from a semiconductor laser light source and reflected light thereof.

In the information recording and/or reproducing apparatus of the above structure, the host computer 36 gives commands of start and stop including rotating directions and rotating speeds of the first and second spindle motors 21, 26, and the clock circuit 35 generates a reference clock signal corresponding to a target speed of the disk 24. The first control circuit 33 accepts the target speed from the clock circuit 35 and the actual speed from the first encoder 25. The first control circuit 33 compares the actual speed with the target speed and outputs a difference between these speeds to the first driving circuit 31. Then the first driving circuit 31 executes the start, acceleration, deceleration, stop, etc. of the rotating part 37 according to the difference between the speeds within a short time, and the disk 24 will be rotated at the target speed after repetition of these processes.

The host computer 36 outputs a target angle of the head 29 to the second control circuit 34 and the second control circuit 34 accepts the actual angle from the second encoder 30. The second control circuit 34 compares the actual angle with the target angle and outputs a difference between these angles to the second driving circuit 32. Then the second driving circuit 32 rotationally drives the shaft 26a of the second spindle motor 26.

Figure 2B:
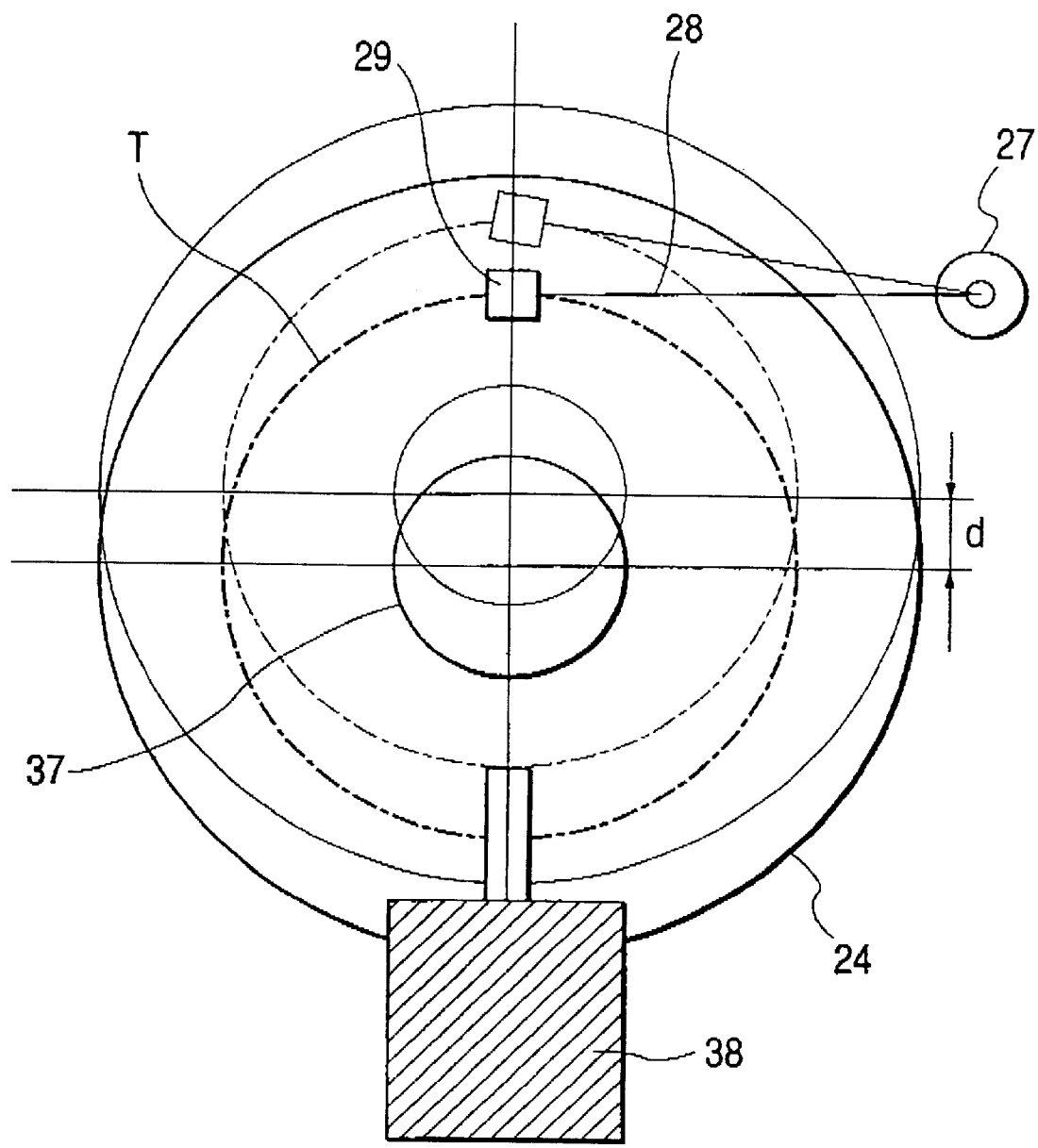
FIG. 2B is a diagram for explaining the action of the first embodiment.
Figure 3:
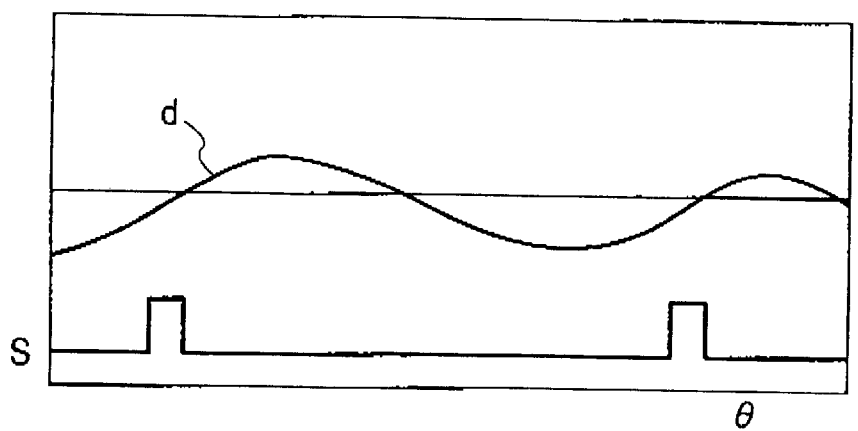
FIG. 3 is a graph to show average deflection amounts in plural rotations of the rotating part.
Figure 4:
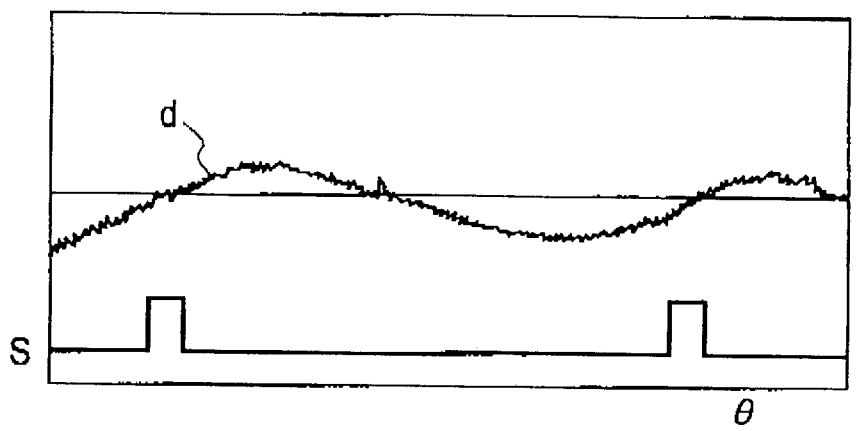
FIG. 4 is a graph to show deflection amounts in one rotation of the rotating part.

At this time, supposing the roundness of the rotating part 37 is low or there exists some deflection as illustrated in FIG. 2B, the disk 24 having a track T is deflected with a deflection d between the position indicated by the solid line and the position indicated by the dashed line. Then the gap sensor 38 outputs the deflection d and index pulse signal S as illustrated in the graph of FIG. 3. In this graph, the axis of abscissas represents the rotating angles e of the rotating part 37, the axis of ordinates represents the deflection d and index pulse signal S, and the deflection d indicates the roundness and radial deflection(runout) of the rotating part 37. FIG. 3 shows average deflection amounts d in plural rotations of the rotating part 37 and FIG. 4 shows deflection amounts d in one rotation of the rotating part 37.

Figure 5:
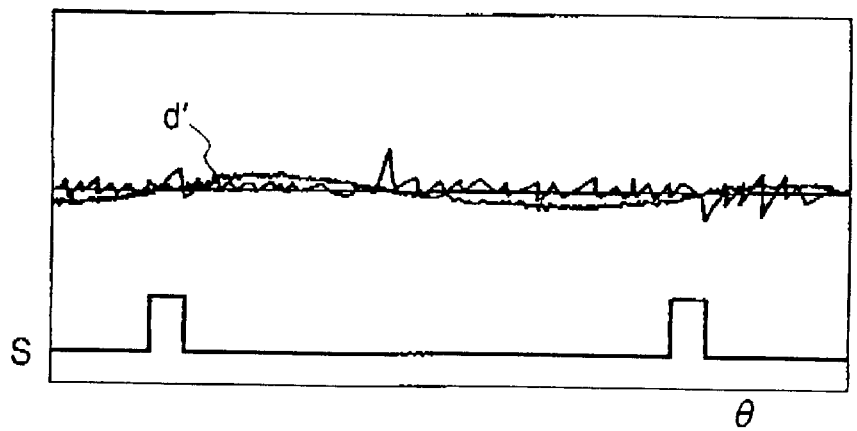
FIG. 5 is a graph to show nonsynchronous deflection amounts.

Next, the second control circuit 34 calculates a non-repeated component, i.e., nonsynchronous radial runout (NRRO; nonsynchronous deflection) of the rotating part 37, based on the deflection d supplied from the gap sensor 38. At this time, the second control circuit 34 subtracts the deflection d illustrated In FIG. 3 from the deflection d illustrated in FIG. 4 to obtain the nonsynchronous deflection d' as illustrated in FIG. 5, and then converts the nonsynchronous deflection into the rotating angle ⊖ of the rotating part 37 to output it to the second driving circuit 32. Then the second driving circuit 32 rotationally drives the second spindle motor 26 by the nonsynchronous deflection d' to correct the actual position of the head 29, whereby the head 29 is set at the desired position or at the track T.

Since the apparatus of the first embodiment is constructed to set the head 29 at the target position by the second spindle motor 26, the second encoder 30, the second driving circuit 32, and the second control circuit 34 and detect the deflection d of the rotating part 37 by the gap sensor 38 to feed it back to the second control circuit 34 as described above, the apparatus can correct the position of the head 29, based on the nonsynchronous deflection d' of the rotating part 37, and can position the head 29 with high accuracy, so as to be able to record or reproduce information with high accuracy.

Figure 6:
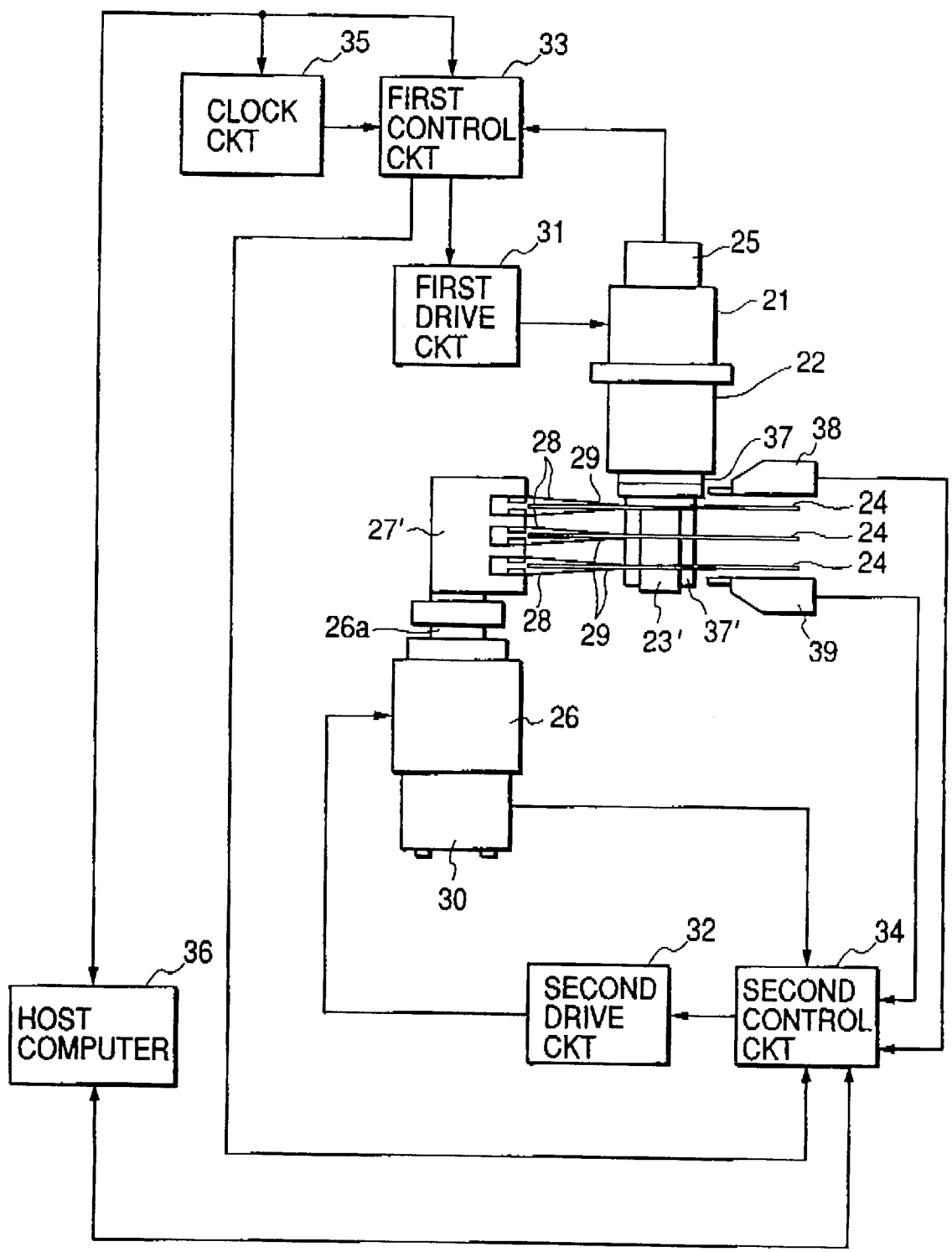
FIG. 6 is a block structural diagram of the second embodiment.

FIG. 6 is a block structural diagram of the second embodiment, in which the same members are denoted by the same reference symbols as in the first embodiment. The clamp unit 23' holds a disk stack of three disks 24, for example. Three pairs of gimbal assemblies 28 having a head stack of three pairs of heads 29 are attached to the mount 27'. A second gap sensor 39, similar to the gap sensor 38 of the first embodiment, is placed in the vicinity of a rotating part 37' at the lower part of the clamp unit 23', and this gap sensor 39 is also connected to the second control circuit 34.

Since the apparatus of the second embodiment is constructed to detect the roundness or eccentricity of the upper rotating part 37 and the lower rotating part 37' by the gap sensors 38, 39, the apparatus can detect the roundness or deflection of the whole of the clamp unit 23', thus achieving the effect similar to that of the first embodiment.

In the first and second embodiments described above the gap sensors 38, 39 are disposed at the most distant position from the heads 29, but they can also be set at the closest position to the heads 29, which is 180° apart from the most distant position. The embodiments may be arranged as apparatus having the function of only recording or only reproduction or the functions of both recording and reproduction.

As described above, the sensor is provided for obtaining the nonsynchronous deflection of the rotating part of the first driving motor and the second driving motor is controlled based on the output of this sensor so as to make the head track the nonsynchronous deflection; therefore, the apparatus can correct the positional deviation of the head due to the nonsynchronous deflection of the rotating part, so as to be able to record or reproduce information with high accuracy.

What is claimed is:

1. An apparatus for recording information on and/or reproducing information from a disk which is an information recording medium, the apparatus comprising:

a recording/reproducing head;

a first driving motor that supports and rotationally drives the disk;

a first encoder unit attached to said first driving motor that detects a rotational speed of said first driving motor and outputs a first signal;

a second driving motor that supports and rotationally drives said recording/reproducing head;

a second encoder unit attached to said second driving motor that detects a rotational angle of a rotating part of said second driving motor and outputs a second signal;

a detection unit that detects a nonsynchronous deflection component of a rotating part of said first driving motor and outputs a third signal, said detection unit comprising a semiconductor laser diode that uses an interference between an emitted beam and a reflected beam; and a control unit that receives the first signal, the second signal and the third signal, and converts the third signal into a rotational angle of the rotating part of said second driving motor, wherein said control unit controls said first driving motor based on a target speed and the first signal, and controls said second motor based on a target position, the second signal and the converted third signal so as to drive said recording/reproducing head to the target position and to compensate the nonsynchronous deflection component.

2. The apparatus according to claim 1, wherein said detection unit detects a roundness or a deflection of the rotating part of said first driving motor.

3. The apparatus according to claim 2, wherein said detection unit detects the roundness or the deflection at a position closest to said head or at a position rotated by approximately 180° from the closest position.

4. The apparatus according to claim 1, wherein said detection unit is a gap detection unit making use of interference between radiated light from a semiconductor laser light source and reflected light thereof.

5. The apparatus according to claim 1, wherein the rotating part of said first driving motor comprises a rotor of a bearing of said first driving motor and a clamp unit coupled to said rotor and supporting said disk.

6. The apparatus according to claim 5, wherein said detection unit detects both a deflection of said bearing and a roundness of said clamp unit.

7. The apparatus according to claim 1, wherein said detection unit detects the nonsynchronous deflection component of the rotating part at positions close to outermost disks out of a stack of disks.

8. The apparatus according to claim 1, wherein said detection unit detects a deflection of said rotating part and said detection unit detects the nonsynchronous deflection component by subtracting an average deflection in plural rotations of said rotating part from a deflection in one rotation of said rotating part.

9. A method for driving a disk which is an information recording medium for recording and/or reproducing information through a head, the method comprising:

a step of rotationally driving the disk with a first motor and rotationally driving the head with a second motor;

a step of detecting a rotational speed of the first motor;

a step of detecting a rotational angle of a rotating part of the second motor;

a step of detecting a nonsynchronous deflection component during rotation of the disk using a semiconductor laser diode that uses an interference between an emitted beam and a reflected beam;

converting the detection result from said step of detecting a nonsynchronous deflection component into a rotational angle of the rotating part of the second motor; and controlling the first motor based on a target speed and the detection result from said step of detecting a rotational speed of the first motor, and controlling the second motor based on a target position, the detection result from said step of detecting a rotational angle of a rotating part of the second motor, and the converted detection result from said converting step, so as to drive the head to the target position and to compensate for the nonsynchronus deflection component.

10. The method according to claim 9, wherein detection of the nonsynchronous deflection component is executed by detecting a deflection of a rotating part during rotation of the disk and subtracting an average deflection in plural rotations of the rotating part from a deflection in one rotation of the rotating part.

* * * * *

UNITED STATES PATENT AND TRADEMARK OFFICE
CERTIFICATE OF CORRECTION

PATENT NO. : 6,552,867 B1
DATED : April 22, 2003
INVENTOR(S) : Hiroyuki Hagiwara It is certified that error appears in the above-identified patent and that said Letters Patent is hereby corrected as shown below:

<u>Column 4,</u>
Line 6, "In" should read -- in --
Line 9, "Θ" should read -- θ --.
Line 18, "detect" should read -- to detect --.

Signed and Sealed this

Twenty-eighth Day of October, 2003

JAMES E. ROGAN
*Director of the United States Patent and Trademark Office*